Nov. 20, 1928.
J. D. ELDER
1,692,294
RACK FOR DRYING OVENS
Filed April 27, 1926
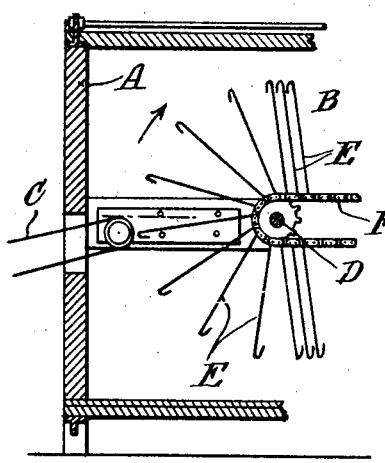
Fig. 1.
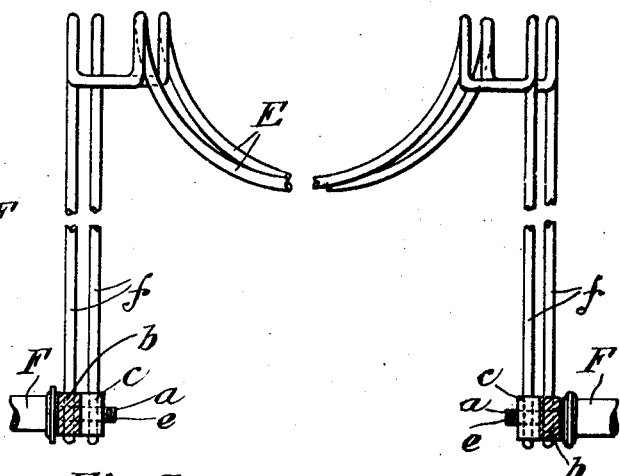
Fig. 2.
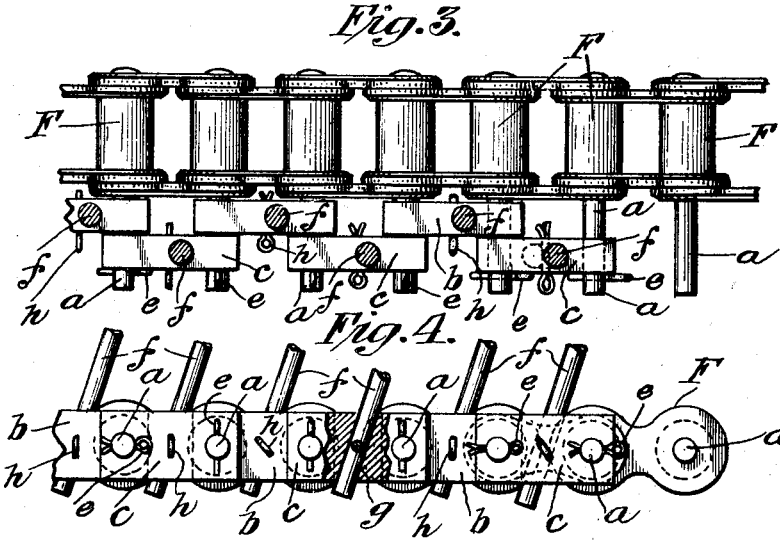
Fig. 3.
Fig. 4.
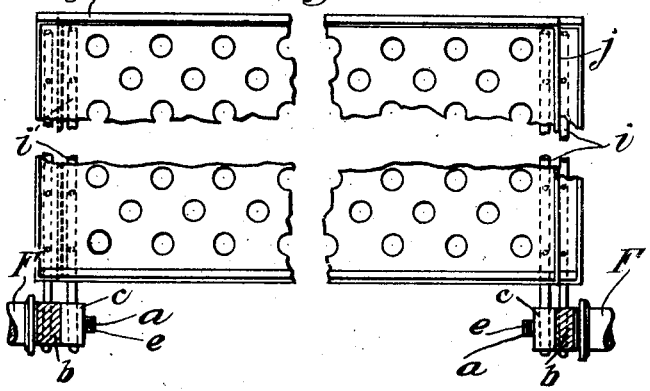
Fig. 5.
John D. Elder
INVENTOR
BY
ATTORNEY.

Patented Nov. 20, 1928.

1,692,294

UNITED STATES PATENT OFFICE.

JOHN D. ELDER, OF ROCKVILLE CENTER, NEW YORK, ASSIGNOR, BY MESNE ASSIGNMENTS, TO CROWN CORK & SEAL COMPANY, INC., OF NEW YORK, N. Y., A CORPORATION OF NEW YORK.

RACK FOR DRYING OVENS.

Application filed April 27, 1926. Serial No. 104,954.

My invention relates to racks for drying ovens, and more particularly to racks of a type in which the article carriers are adapted to receive flat objects such as decorated metal sheets possessing little or no flexibility, or other more flexible sheets, which carriers are supported upon endless sprocket chains by means of which the sheets are supported and transported through the oven structure proper.

Heretofore racks of the type to which my invention relates have been used in drying decorated tin sheets by transportating them through ovens of a length of fifty feet or more, thus requiring chains of considerable length and the carrying by these chains of a considerable aggregate load. It has been the practice to mount the carriers in relation to the chain structure by means of studs riveted to side plates of the links of the chain, and this practice has not only developed difficulties in assembling the carriers with relation to the chains, but from disarrangement of the whole rack structure due to the breakage of the carriers or their disarrangement resulting not only in the separation of the carriers from the chains, but in a displacement thereof to an extent to interfere with the mechanical feeding of the tin or other sheets upon the carriers.

When such breakage or displacement occurs it is not only followed by losses due to a shutting down of the whole oven, but these losses are very much aggravated because of the difficulties of effecting repairs which sometimes require the taking down of the entire rack structure and the separation and replacement of links in the chains preparatory to the reassembling of the rack structure in the oven.

With the above conditions in mind, I have provided a rack structure in which the carriers will be so mounted in relation to the sprocket chain structure as to not only afford a substantial support for the carriers, but in which the supporting means are so combined in the chain structure, as to effectively resist the breaking strains thereon from the carriers and the loads thereon.

The means used for mounting the carriers in relation to the chains, instead of weakening the chain structure, will serve as a very substantial reinforcement to this structure, thus assisting the chain proper in affording the desired substantial support to the carriers. Furthermore the legs of each carrier by means of which it is connected with oppositely arranged parallel chains, are afforded long bearings in members incapable, if loosened, of rotary movement with relation to the chain proper, said members having dimensions sufficiently large to permit the setting of the carriers at any desired angle.

In a rack structure embodying my invention the carriers and supports therefor may be quickly assembled in, or disassembled from, the chains of the rack structure, so that in the event of the breakage of a carrier it may be readily removed from the machine and replaced, without taking down the chain structure itself, thus permitting repairs when necessary to be rapidly made.

In a rack structure embodying my invention, the plates of the chain are relieved of all direct loads from the carrier, this load being sustained by the pivot pins of the chain structure and being distributed between the adjacent pins so as to avoid a concentration of the load, particularly when the carriers are in a substantially horizontal position and are having the sheets delivered thereto.

The invention consists primarily in a rack for drying ovens embodying therein parallel sprocket chains having laterally extending pivot pins, blocks having openings therethrough adapted to receive said pivot pins whereby said blocks may be pivotally mounted upon said pins, means holding said blocks against displacement with relation to said pins, said blocks having openings therein intermediate the portions thereof engaging said pivot pins, a carrier having legs entering said openings, and means passing through the walls of said blocks respectively and said legs for securing said legs in relation to said blocks; and in such other novel features of construction and combination of parts as are hereinafter set forth and described, and more particularly pointed out in the claims hereto appended.

Referring to the drawings,

Fig. 1 is a side view of one end of an oven with a fragmentary portion of a rack structure;

Fig. 2 is a condensed end view of the rack structure;

Fig. 3 is a plan view of one of the chains upon a still larger scale;

Fig. 4 is a side view of the structure shown in Fig. 3; and

Fig. 5 is a view of a modified form of the invention adapting it for use with sheets of flexible material.

Like letters refer to like parts throughout the several views.

In the embodiment of the invention shown in Fig. 1, A indicates a part of the drying oven structure, B a part of the rack structure and C a part of the automatic feeding mechanism for delivering sheets to the carriers of the structure B. The rack structure B is composed of a large number of carriers mounted upon parallel sprocket chains so that when said chains are passing from one horizontal reach to the other horizontal reach about a sprocket wheel, indicated at D, the carriers will assume a diverging relation as shown clearly in Fig. 1, thus affording a wide entrance between adjacent carriers for the reception of sheets delivered to the carrier from the mechanism C, or the delivery of such sheets from the carrier.

The carriers proper are indicated at E and the chains at F.

The construction and arrangement of parts above referred to is old and well known in this art, it having been the practice to secure the legs of the carriers E to the chains F by means of studs riveted or otherwise secured to the side plates of said chains.

As stated above, this construction has proven a source of great difficulty and expense in the operation of such ovens, due in part to the loosening of such studs, in part to their breakage, and largely to the difficulties of replacing or repairing such studs and the losses resulting from the necessary shutting down of the oven while these repairs, however slight, are being affected.

The accidental separation of any carrier E will also interfere with the automatic feeding of sheets to the rack, although because of the losses resulting from the shutting down and cooling of an oven, to permit the making of repairs, it is not uncommon to operate the ovens with a carrier or carriers missing.

My present invention relates more particularly to those features of the construction of the rack structure which will avoid those difficulties resulting from the frequent disconnection of carriers from the chain structure, and afford a reinforcement to the whole rack structure in a manner to permit a more reliable handling of the sheets.

The construction of the chains F is of an old and well known form except as to the pivot pins $a$ thereof, which extend beyond the side plates of the machine for a considerable distance as clearly shown in Fig. 3 of the drawings. Loosely mounted upon these pivots $a$ are inner blocks $b$ and outer blocks $c$, the said inner and outer blocks being staggered in relation to each other, and being mounted respectively upon adjacent pivots so as to not only serve as a reinforcement for these pivots and for the adjacent links of the chain, but to avoid any possible material swaying of the carriers lengthwise of the chain or laterally of the rack structure. In fact the mounting of the blocks $b$ and $c$, in the manner described, affords a highly stable support for the carriers and at the same time, adds greatly to the strength of the chain structure since these blocks will take up a part of the load resulting from the run of the chains, thus permitting the use of a fairly tight chain.

The blocks $c$, those mounted adjacent the outer end of the pivot $a$ serve to confine the blocks $b$, the blocks mounted adjacent the side of the chains being secured in position upon the pivot pins $a$ by a quickly releasable securing means as the split cotter pins $e$, which not only have the advantage of being quickly removed and positioned with relation to the pivot pins $a$, but also of not being subject to becoming loosened as a result of vibrations in and about the chains.

The dimensions of the various blocks $b$ and $c$, and the manner of mounting them upon adjacent pivot pins $a$, affords ample space between adjacent pins $a$ for the legs $f$ of the carriers E, without interfering with any part of the chain structure. This portion of the blocks $b$ and $c$ has an opening therein indicated at $g$, which preferably passes entirely through the block, and may extend at an incline as shown, or directly vertically if desired, thus affording a bearing for the leg $f$ of the carrier extending for the full depth of the blocks. The legs $f$ of the carrier are secured in position by any desired quickly releasable means as the split cotter pins $h$ passing through openings in the blocks and in said legs. This construction avoids any necessity for a special shouldered formation of the legs $f$, and permits the full springiness of the legs to be utilized in mounting the carriers upon the blocks $b$ or $c$ of the chain structure.

This manner of mounting the carriers also affords great strength in the supports for the carriers in the direction of the length of the chain F, which condition is highly desirable since variation in the load as each carrier is taking the curve from one reach of the chain to the opposite reach, subjects the supports for the carriers to great stresses at this point, particularly when large sheets of tin are being delivered to, or removed from, the rack.

The construction and arrangement of the blocks $b$ and $c$ is such that they may be quickly and accurately manufactured in large quantities, it being possible to drill a large number of blocks at the same time, to form the openings to receive the pivot pins *a* and cottor pins *h*.

In the form of the invention shown in Figs. 1 to 4, the blocks *b* and *c* may be assembled in the chain structure F before the chain is mounted in the oven structure, and the carriers E thereafter connected with the blocks *b* and *c*. If desired, however, the chain F with its elongated pivot pins *a* may be first assembled in the structure and the blocks *b* or *c* then mounted upon said pins *a*, the carriers E then being secured to said blocks by means of the cottor pins *h*. In either case the legs *f* of the carriers may be sprung towards each other in a manner to facilitate the mounting of said carriers upon said blocks, or if desired the blocks may be first secured to the legs of the carriers E and the blocks mounted upon the pivot pins *a* of the chain after this chain has been assembled in the oven, the cotter pins *e* being inserted through the openings toward the end of the pivot pins *a* after the mounting of the blocks upon said pivots, the legs *f* being sprung towards each other with the blocks attached thereto when so mounting the blocks.

In case of the breakage of a carrier E, it is merely necessary to remove the cotter pin *h*, remove the legs *f* from the openings *g* and mount another carrier within these blocks without removing the blocks from the chain, or the chain from the oven. Since the legs *f* have merely a close sliding fit within the opening *g* such repairs may be quickly effected without the use of any tool excepting that necessary to spread the ends of the cotter pin.

The blocks *b* and *c* preferably all have the same shape so as to avoid the necessity for the construction of right and left blocks, as well as to permit the production of these blocks from bar stock without requiring finishing thereof beyond the drilling of the necessary openings *g* for the legs *f* and the openings for the cotter pins *h*.

In making repairs, the springiness of the carriers E will permit the legs *f* to be brought to the proper position to pass freely into the openings *g*, the outward spring of these legs assisting in maintaining the blocks *b* and *c* in the proper relation to each other and to the chain proper F. This is secured by extending the pivot pins *a* inwardly of the rack structure as shown more particularly in Fig. 2.

It will be noted that the blocks *c* serve as spacers in relation to the blocks *b*, and that the alternated inner and outer blocks form a continuous link structure in connection with the pivot pins *a* which will assist very materially in preventing stretch of the chain.

In the embodiment of the invention shown in Fig. 4, instead of using a heavy wire construction in the carrier E, I provide straight arms *i*, one end of each of which is connected to the pivot pins *a* by means of blocks *b* and *c* in the manner heretofore described, said arms having riveted or otherwise secured thereto, a pan *j* having perforations through the bottom thereof to permit a more or less free circulation of the heated air about a sheet possessing insufficient rigidity to support its own weight upon an open carrier structure of the type shown in Fig. 2.

By the construction herein described, I secure increased strength in the entire moving rack structure, minimize likelihood of disarrangement of the carrier supports with relation to the chain structure proper, afford a much steadier support for the carriers E, and permit the quick and convenient installation, removal and replacement of said carriers E when necessary.

When using the wire carrier structure, it is preferable to have one leg of the carrier co-operate with a block *b* upon one chain and a block *c* upon the other chain, and to have the adjacent carrier engage a block *c* upon the first mentioned chain and a block *b* upon the other chain, thus securing that desired slightly staggered relation of adjacent carriers, while permitting all carriers to be of the same dimensions.

It is not my intention to limit the invention to the precise details of construction shown in the accompanying drawings, although this construction has been found to give very satisfactory results in use, to be extremely durable, and not to be affected by the heat conditions in the oven.

Having described the invention, what I claim as new and desire to have protected by Letters Patent, is:—

1. A rack for drying ovens embodying therein parallel sprocket chains having laterally extending pivot pins, blocks having openings therethrough adapted to receive said pivot pins whereby said blocks may be pivotally mounted upon said pins, means holding said blocks against displacement with relation to said pins, said blocks having openings therein intermediate the portions thereof engaging said pivot pins, a carrier having legs entering said openings, and means passing through the walls of said blocks respectively and said legs for securing said legs in relation to said blocks.

2. A rack for drying ovens embodying therein parallel sprocket chains, having pivot pins extended laterally from the side plates at one side of the chain, blocks having openings therethrough adapted to receive said pivot pins whereby said blocks may be pivotally mounted upon said pivot pins, said blocks being alternately positioned adjacent the side plates of the chain and adjacent the ends of the pins, means co-operating with the block positioned adjacent the end of the pivot pins and with the pivot pins respectively holding said blocks against displacement in relation to said pins, said blocks having openings therein intermediate the portions thereof engaging said pivot pins, carriers having legs entering openings in oppositely arranged blocks, and means passing through the walls of said blocks respectively and said legs for securing said legs in relation to said blocks.

3. A rack for drying ovens embodying therein parallel sprocket chains, having pivot pins extended laterally from the side plates at one side of the chain, blocks having openings therethrough adapted to receive said pivot pins whereby said blocks may be pivotally mounted upon said pivot pins, said blocks being alternately positioned adjacent the side plates of the chain and adjacent the ends of the pins, quick releasable means co-operating with the block positioned adjacent the end of the pivot pins and with the pivot pins respectively holding said blocks against displacement in relation to said pins, said blocks having openings therein intermediate the portions thereof engaging said pivot pins, carriers having legs entering openings in oppositely arranged blocks, and means passing through the walls of said blocks respectively and said legs for securing said legs in relation to said blocks.

4. A rack for drying ovens embodying therein parallel sprocket chains, having pivot pins extended laterally from the side plates at one side of the chain, blocks having openings therethrough adapted to receive said pivot pins whereby said blocks may be pivotally mounted upon said pivot pins, said blocks being alternately positioned adjacent the side plates of the chain and adjacent the ends of the pins, means co-operating with the block positioned adjacent the end of the pivot pins and with the pivot pins respectively holding said blocks against displacement in relation to said pins, said blocks having openings therein intermediate the portions thereof engaging said pivot pins, bent wire carriers having legs entering openings in oppositely arranged blocks, the side walls of said blocks and said legs having openings therethrough, and quick releasable means passing through said openings and engaging said blocks and said legs for securing said carriers in relation to said blocks.

5. A rack for drying ovens embodying therein parallel sprocket chains, having pivot pins extended laterally from the side plates at one side of the chain, blocks having openings therethrough adapted to receive said pivot pins whereby said blocks may be pivotally mounted upon said pivot pins, said blocks being of the same dimensions, configuration and construction, and being alternately positioned adjacent the side plates of the chain and adjacent the ends of the pins, means co-operating with the block positioned adjacent the end of the pivot pins and with the pivot pins respectively holding said blocks against displacement in relation to said pins, said blocks having openings therein intermediate the portions thereof engaging said pivot pins, carriers having legs entering openings in oppositely arranged blocks, and means passing through the walls of said blocks respectively and said legs for securing said legs in relation to said blocks.

6. A rack for drying ovens embodying therein parallel sprocket chains, having pivot pins extended laterally at one side of the chain, said blocks being of the same dimensions, configuration and construction, and being alternately positioned adjacent the side plates of the chain and adjacent the ends of the pins, whereby the blocks adjacent the chains act as spacers with relation to the blocks adjacent the ends of the pins, said pivot pins having openings toward the ends thereof and closely adjacent the outer face of the blocks positioned towards the ends of the pins, cotter pins adapted to pass through said openings in engaging relation with said last named blocks, said blocks each having an opening passing therethrough, at an abrupt angle to the axes of said pivot pins, and an opening therethrough communicating with said last named openings, bent wire carriers having legs passing through the openings in oppositely arranged blocks, and also having openings passing through said legs, and cotter pins adapted to pass through said openings in said blocks and through said openings in said legs.

In witness whereof I have hereunto affixed my signature, this 23d day of April, 1926.

JOHN D. ELDER.